May 12, 1970   R. W. CLYNE   3,511,383
WASTE HANDLING APPARATUS
Filed Jan. 23, 1969   2 Sheets-Sheet 1

Inventor
Robert W. Clyne
by: Pendleton, Neuman
Seibold & Williams
Att'ys

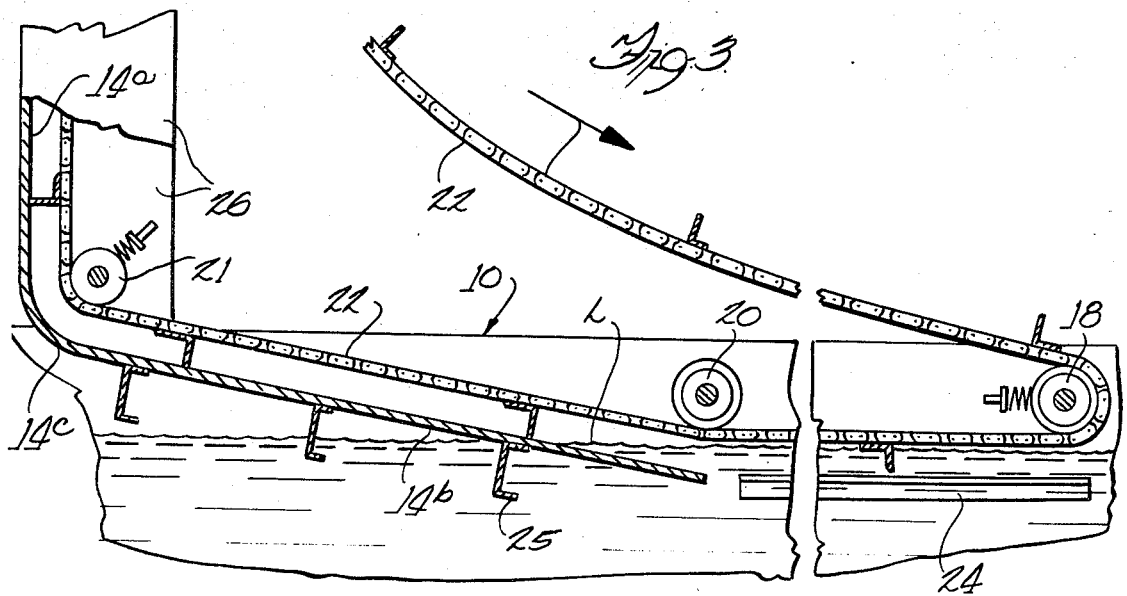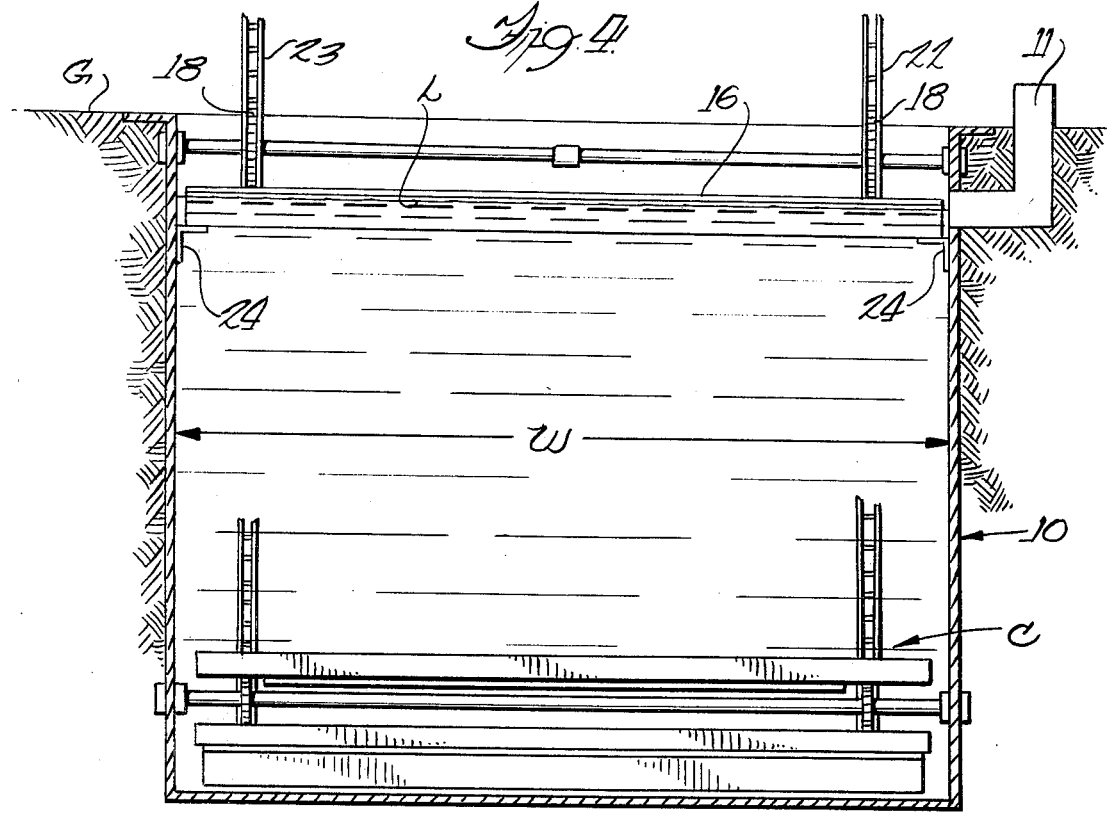

United States Patent Office 3,511,383
Patented May 12, 1970

---

3,511,383
WASTE HANDLING APPARATUS
Robert W. Clyne, 5701 Sheridan Road,
Chicago, Ill. 60626
Filed Jan. 23, 1969, Ser. No. 793,501
Int. Cl. B01d 21/04
U.S. Cl. 210—526                                      6 Claims

ABSTRACT OF THE DISCLOSURE

An apparatus is provided for handling waste floating on the surface of a liquid product which has been collected in a settling tank or the like. The apparatus includes a power driven, endless, flighted carrier member which is mounted to move the flights thereof through successive segments of travel whereby each flight first engages the floating waste and moves same along the surface of the liquid product to an upwardly inclined frame section. The engaged waste is moved by the flight up the inclined frame section to a location above the liquid product surface whereupon it is then elevated vertically to a discharge station disposed a substantial distance above the top of the tank.

BACKGROUND OF THE INVENTION

Heretofore in the handling of floatable waste accumulated on the surface of a liquid product, it was extremely difficult to elevate the waste to a readily accessible discharge station whereby it could be conveniently collected and handled for subsequent treatment or disposal. In the past, the discharge station for the tank required either that the tank walls project a substantial distance above ground level; or, if the tank was recessed and the top thereof substantially flush with ground level, then a pit of some sort was required to be provided adjacent the exterior surface of one of the tank walls and into the pit was positioned an elevating mechanism to handle the waste removed from the tank. The shortcomings of either of these arrangements are obvious.

Various other apparatus for handling floatable waste have been proposed; however, because of structural design, they are extremely costly and inefficient in operation, and/or are difficult and awkward to maintain in proper operating condition, particularly when said apparatus is operated only intermittently.

SUMMARY OF THE INVENTION

Thus, it is an object of this invention to provide a waste handling apparatus which is capable of either continuous or intermittent operation and is capable of readily handling a variety of floatable waste products.

It is a further object of this invention to provide a waste handling apparatus which may be incorporated in an existing settling tank and used in conjunction with or to augment other existing product handling equipment.

Further and additional objects will appear from the description, accompanying drawings and appended claims.

In accordance with one embodiment of this invention an apparatus is provided for the automatic handling of waste which floats on the surface of a liquid product collected in an industrial type of settling tank. Tanks of this type are normally of large volume, of substantial depth and have vertical walls provided with influent and effluent ports. The apparatus in question includes a frame having a first section which extends vertically upwardly from above the surface of the liquid product. The first section is normally disposed adjacent one of the vertical tank walls and the upper end of the first section terminates at a discharge station which is disposed a substantial distance above the top of the tank. The frame also includes a second section which extends angularly downwardly from the lower end of the frame first section. The lower end of the first section is connected to the upper end of the second section by a smooth curved plate. The lower end of the frame second section terminates beneath the surface of the liquid product. The apparatus also includes a power driven, flighted carrier which is mounted on the frame for movement through successive segments of travel. Each flight of the carrier, when moving through said successive travel segments, has a protruding portion thereof which initially engages the floatable waste and moves same along the surface of the liquid product towards the frame second section. Once the moved waste engages the inclined surface of the frame second section, the flight then moves the waste up the inclined surface over the smooth curved plate to the lower end of the first section whereupon the flights proceed to move the engaged waste vertically upwardly to the discharge station.

For a more complete understanding of the invention reference should be made to the drawings wherein:

FIG. 3 is an enlarged fragmentary sectional view taken along line 3—3 of FIG. 2.

FIG. 4 is an enlarged fragmentary sectional view taken along line 4—4 of FIG. 1.

Figure 1:
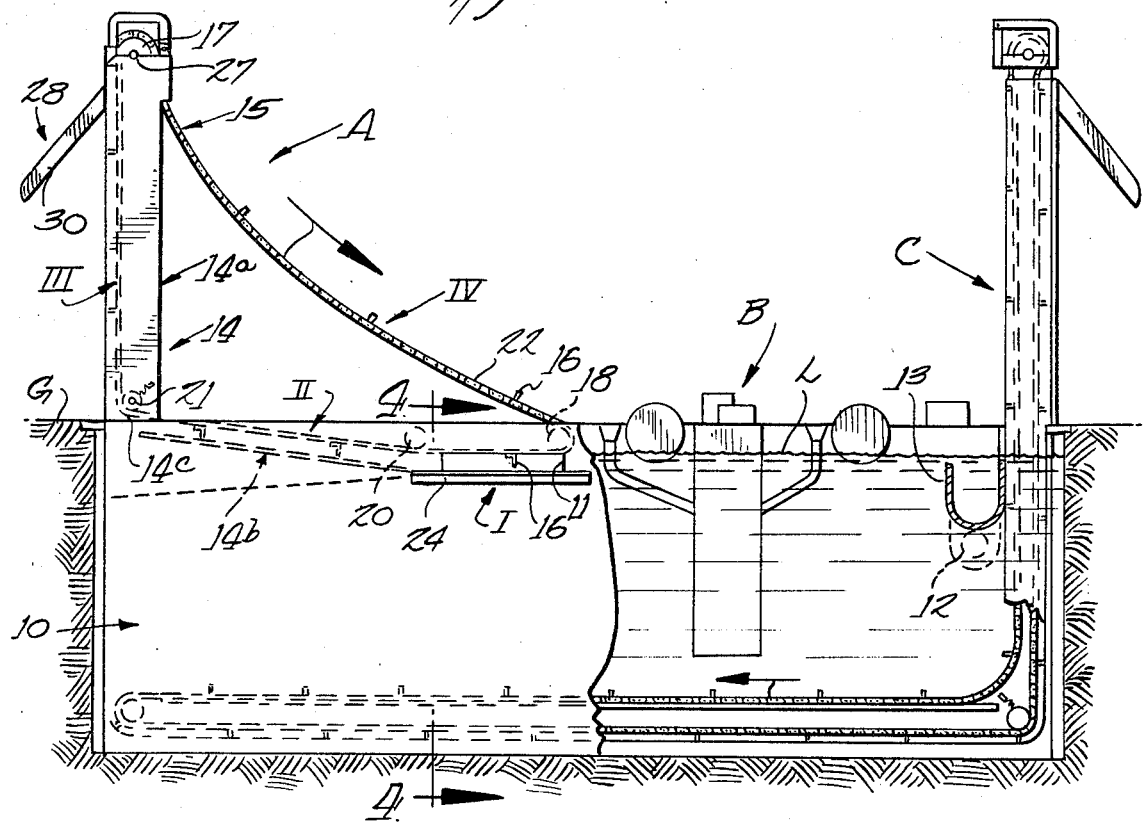
FIG. 1 is a fragmentary vertical sectional view of one form of the improved apparatus shown disposed within a settling tank.
Figure 2:
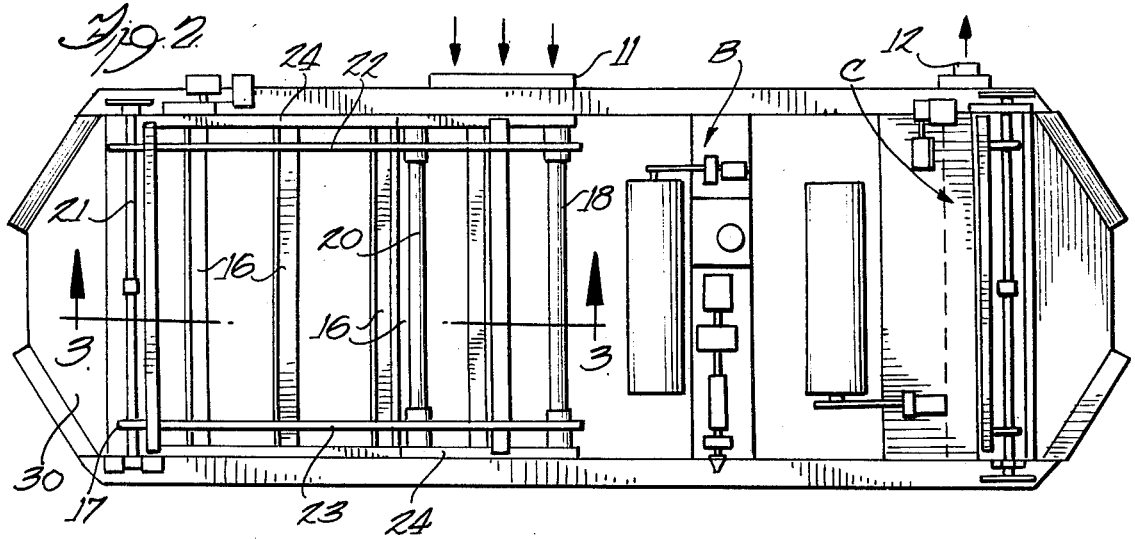
FIG. 2 is a top plan view of the apparatus of FIG. 1.

Referring now to the drawings and more particularly to FIG. 1, an industrial type settling tank 10 is shown which has an open top disposed substantially flush with the ground level G. The tank itself may vary over a wide range in size and construction. In general, however, such tanks are of large volume, have a substantial depth, and have vertical walls delimiting a substantially horizontal bottom. The tank 10 is provided with influent and effluent ports 11 and 12 which are spaced relative to one another. Effluent port 12 in the illustrated embodiment is connected to a weir 13 which is disposed within the tank and adjacent one end thereof. The weir 13 controls the level of the liquid discharged into the tank through port 11.

FIG. 1 shows the improved waste handling apparatus A disposed within the tank 10 and working in conjunction with two other types of apparatus B and C which are not to be considered as forming a part of the invention in question. Suffice to say that apparatus B functions primarily as a means for the recovery of oil, which might have been entrained in the waste liquid discharge into the tank 10 through port 11. Apparatus C, on the other hand, functions primarily to remove waste solids which have gravitated to the bottom of the tank. One form of apparatus C is described in my U.S. Pat. 3,303,920. In FIG. 1, apparatus A is shown located at one end of the tank with apparatus C located at the opposite end and with apparatus B disposed therebetween. Where the liquid product contains only floatable waste, apparatus B and C may not be required.

Apparatus A comprises a frame 14 having a vertical section 14a and a laterally extending downwardly inclined section 14b which is connected to the lower end of section 14a by means of a smooth curved plate 14c. The frame 14 is secured to the end wall of the tank by any suitable means.

Mounted on frame 14 is an endless flighted carrier member 15. The flights 16 of carrier member 15 are adapted to travel through successive segments of travel I–IV as the member 15 is driven in a clockwise direction, see FIG. 1, by a pair of axially aligned drive sprockets or pulleys 17. The sprockets 17 are driven by a suitable electric motor or the like, not shown. In addition to drive sprockets 17, there are provided a plurality of idler sprockets or rollers 18, 20 and 21 which control the direction of travel of the flights through the various segments of travel, to be described more fully hereinafter.

The carrier member 15 in the illustrated embodiment includes a pair of spaced endless chain or belt sections 22 and 23. The chain sections are preferably disposed in parallel vertical planes located adjacent the side walls of the tank. Each flight 16 is preferably an elongated member having an L-shaped cross-sectional configuration.

One leg of the L-member is connected to or forms a link of the chain section. The other leg projects transversely outwardly from the chain section. The length of the flight 16 closely approximates the distance W between the opposed interior surfaces of the tank side walls, see FIG. 4.

During segment I of travel, the ends of the flight 16 slidably engage horizontally extending brackets 24 which are secured to the side walls of the tank, see FIG. 4. These brackets are disposed in a horizontal plane which is located just below the influent port 11. When the flights 16 are in contact with brackets 24, a portion of each of the chain sections 22 and 23 is disposed slightly above the level L of the liquid which has accumulated in the tank. The distance the flight will travel while passing through segment I will depend upon the length of the tank and the location of port 11.

Once the flight passes under idler roller 20, it commences to move up the inclined frame section 14b or through segment II of travel. As the flight moves horizontally to the left, as viewed in FIG. 1, the flight will cause any floatable waste entrained in the influent liquid to be contacted and moved towards the distal edge of frame section 14b, which is located beneath the level of the accumulated liquid, see FIG. 3. Frame section 14b is in the form of an imperforate plate, the width of which closely approximates the width W of the tank, see FIG. 4. The plate is normally end-welded to the tank side walls and is supported in its properly inclined position by a plurality of transversely extending beams 25 which have the ends thereof supported by the tank walls. The outer or upper edge of the plate is made integral with the lower edge of a smooth curved imperforate plate 14c which is also secured to the side walls of the tank. The curvature of the plate 14c is uniform so that the flights, as they pass around idler roller 21, will be in constant contact with the frame. Idler roller 21 is spring loaded so as to effect the constant positive contact between the flights and plate 14c.

The frame section 14a is in the form of a vertically extending imperforate plate which has the same width as the inclined plate 14b and curved plate 14c. The vertical side edges of frame section 14a are provided with flanges 26. The flanges support the ends of the spring-loaded idler roller 21 and the axle 27 to which the drive sprockets 17 are keyed.

The height of frame section 14a is preferably such that a truck or wagon, not shown, can be positioned beneath the elevated discharge station 28. The discharge station 28 includes a downwardly extending chute 30 which catches the flight elevated waste that is removed when each flight reaches the discharge station 28 and prior to the flight moving around the driven sprocket 17. The flights are moving vertically upwardly from idler roller 21 to sprocket 17 while in the segment III of travel.

As the flights and associate portions of the chain sections move through segment IV of travel, that is downwardly from sprockets 17 to roller 18, they form a catenary, see FIG. 1.

The operation of the chain sections is normally intermittent and may be programmed to work automatically on a predetermined time cycle or may be actuated manually, when desired. Once the waste has been discharged at station 28, it may be collected and disposed of in any desirable manner.

The number of flights carried by the chain sections, the length of travel of each flight through the various segments of travel, and the size and inclination of the plate 14b and the height of frame section 14a may be varied from that shown in the drawings and will depend upon the type of waste being handled and the size of tank involved.

Thus, it will be seen that a simple, yet efficient, apparatus has been provided which is readily capable of handling floatable waste on either a continuous or intermittent basis.

I claim:

1. The combination of a tank for accumulating in substantially quiescent state a liquid product containing floatable waste, and an apparatus for removing the floatable waste from the accumulated liquid product, said tank having upright walls provided with spaced influent and effluent ports, and means for maintaining the accumulated liquid product level at a first predetermined distance below the tank upper limits; said apparatus comprising a frame having a first wall section disposed inwardly of and adjacent to one tank wall and extending vertically upwardly therefrom to a station elevated with respect to the tank upper limits, means located at said station for effecting discharge of the waste externally of the tank, an inclined second wall section disposed within said tank, said second wall section having the lower end limit thereof remote from the vertical plane of said first section and spaced a second predetermined distance below said tank upper limits, the upper end limit of said second wall section being adjacent the vertical plane of said first wall section, said second wall section upper end limit being spaced a third predetermined distance below said tank upper limits, said first predetermined distance being less than said second predetermined distance and said second predetermined distance being greater than said third predetermined distance, and an upwardly curved third wall section interconnecting the upper end limit of said second wall section and said first wall section; and a conveyor assembly mounted on and carried by said frame, said assembly including a power driven endless carrier mounted for movement through successive segments of travel, a plurality of elongated flights carried by said carrier and movable therewith, each flight being disposed transversely of the direction of movement of said carrier and having a waste-engaging projecting portion which successively engages corresponding surfaces of said second, third, and first wall sections while said flight moves through certain successive segments of travel, said flight projecting portion being disposed at approximately said first predetermined distance from said tank upper limits during an initial segment of travel for contacting and moving the floatable waste towards said second wall section and then along said wall sections to said station, and means for returning said flights from said waste discharge station directly to the beginning of said initial segment of travel in a path located substantially above the tank upper end limits and within the area delimited by said tank walls.

2. The apparatus of claim 1 wherein said means for discharging waste at said station includes a chute mounted on said frame first wall section adjacent said station and substantially externally of said tank, said chute extending downwardly and outwardly from said first wall section.

3. The apparatus of claim 1 wherein each flight spans substantially the distance between opposed tank walls.

4. The apparatus of claim 3 including substantially horizontally disposed supports engaged by each of said flights when the latter are moving through the initial segment of travel whereby the engaged floatable waste is moved towards the lower end limit of said frame second wall section.

5. The apparatus of claim 1 wherein said carrier means comprises a pair of endless transversely spaced chainlike sections to which each flight is connected whereby all of said flights remain in horizontal parallel positions while moving through said successive segments of travel.

6. The apparatus of claim 5 including rotating guide means carried by said frame and engaged by said chain sections for varying the direction of movement of said flights when passing through said successive segments of travel.

References Cited

UNITED STATES PATENTS 2,888,143   5/1959   Seidenstricker _____ 210—525

JAMES L. DECESARE, Primary Examiner

U.S. Cl. X.R.

210—525